(12) United States Patent
Tanguay et al.

(10) Patent No.: US 11,566,368 B1
(45) Date of Patent: Jan. 31, 2023

(54) VISION SYSTEMS AND METHODS FOR LOCATING FIDUCIALS IN MANUFACTURING FABRIC ARTICLES

(71) Applicant: CreateMe Technologies LLC, New York, NY (US)

(72) Inventors: Michael William Tanguay, Camas, WA (US); Michael Corliss, Beaverton, OR (US); Nicholas Chope, Portland, OR (US); Martin Frederick Bamberger, Beaverton, OR (US)

(73) Assignee: CreateMe Technologies LLC, New York, NY (US)

( * ) Notice: Subject to any disclaimer, the term of this patent is extended or adjusted under 35 U.S.C. 154(b) by 0 days.

(21) Appl. No.: 17/842,582

(22) Filed: Jun. 16, 2022

(51) Int. Cl.
   *G06T 7/00* (2017.01)
   *D06H 3/08* (2006.01)
   *G06T 7/73* (2017.01)
   *G06T 7/13* (2017.01)

(52) U.S. Cl.
   CPC ............. *D06H 3/08* (2013.01); *G06T 7/0004* (2013.01); *G06T 7/13* (2017.01); *G06T 7/73* (2017.01); *G06T 2207/30124* (2013.01); *G06T 2207/30204* (2013.01)

(58) Field of Classification Search
   CPC . D06H 3/08; A41H 3/08; A41H 42/00; G06T 2210/16; G06T 7/73; G06T 7/13; G06T 7/0004; G06T 2207/30124; G06T 2207/30204
   USPC ...... 356/429–431, 238.1, 238.2; 250/559.01, 250/559.45; 700/144, 59; 382/111; 57/264
   See application file for complete search history.

(56) References Cited

U.S. PATENT DOCUMENTS

| 7,461,444 | B2 | 12/2008 | Deaett et al. |
| 10,366,175 | B2* | 7/2019 | Gupta ................ G06Q 30/0621 |
| 10,448,680 | B2 | 10/2019 | Howland |
| 10,607,333 | B2* | 3/2020 | Huotilainen .......... G06T 7/0004 |
| 2009/0028417 | A1 | 1/2009 | Floeder et al. |

* cited by examiner

*Primary Examiner* — Hoa Q Pham
(74) *Attorney, Agent, or Firm* — Patterson + Sheridan, LLP

(57) ABSTRACT

A fiducial for use in the manufacture of a fabric article includes a hole through a layer of fabric. Another layer of fabric of the fabric article overlays and obscures the fiducial. The fiducial is detected by transmitting electromagnetic radiation through the fabric article. The electromagnetic radiation may make a single pass directly through the fabric article to a sensor, or may pass through the fabric article, be reflected off a surface, and pass back through the fabric article to the sensor.

16 Claims, 12 Drawing Sheets

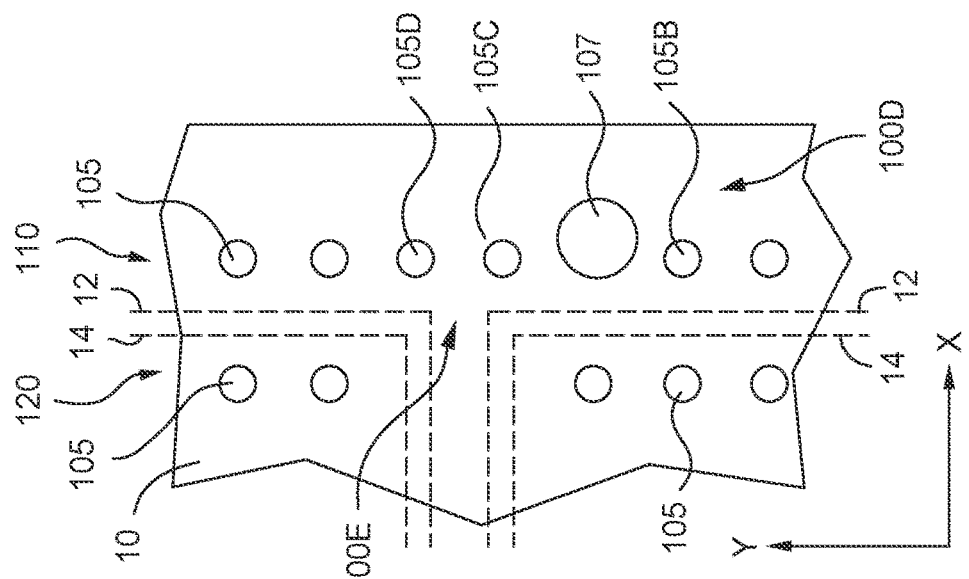
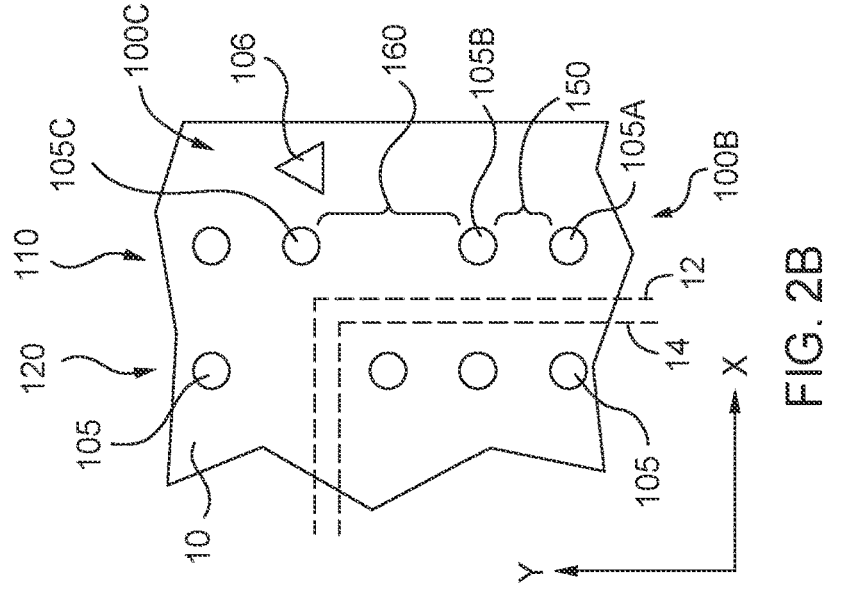
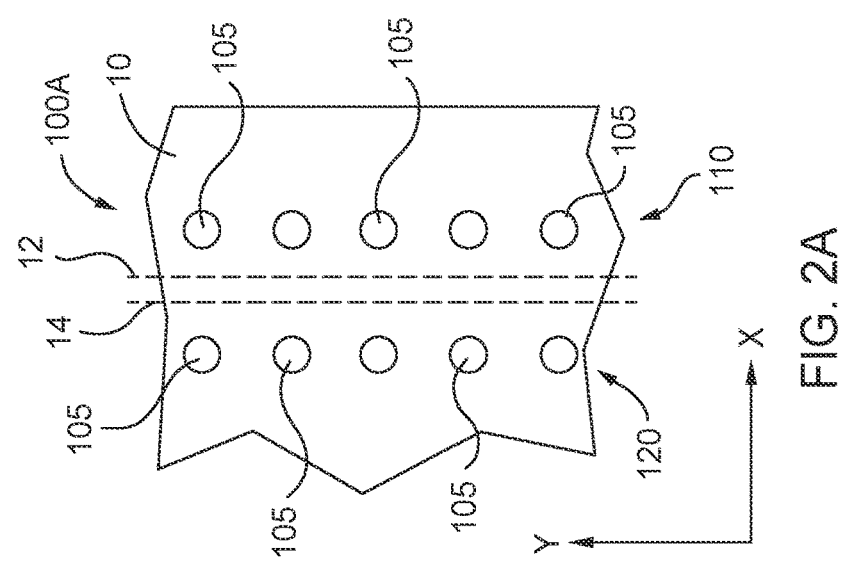
FIG. 2A
FIG. 2B
FIG. 2C

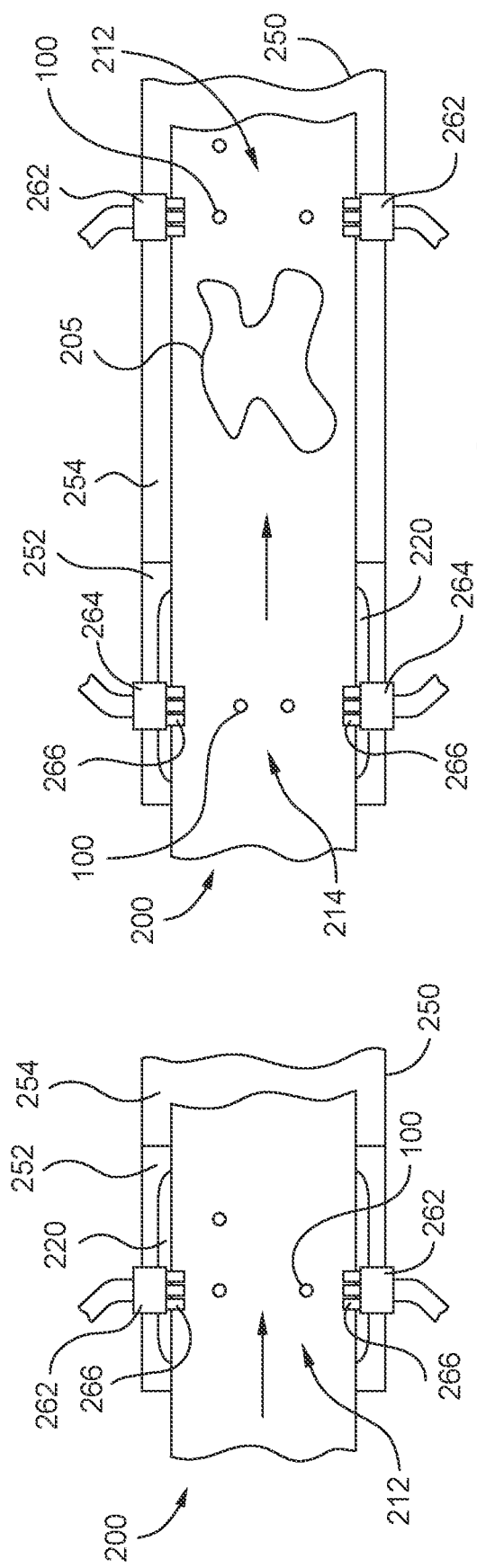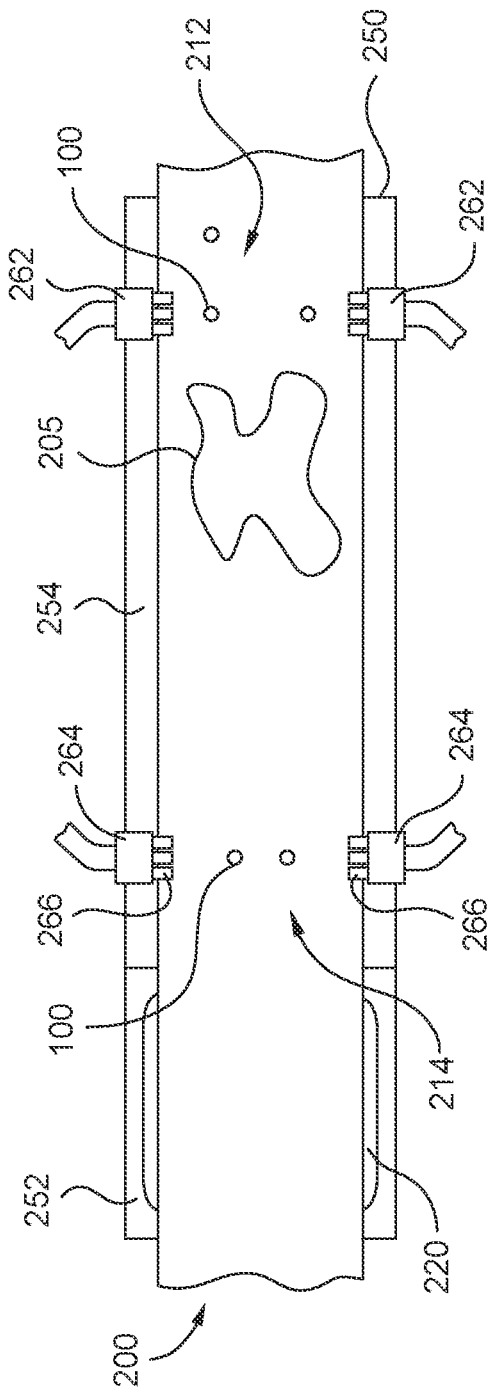

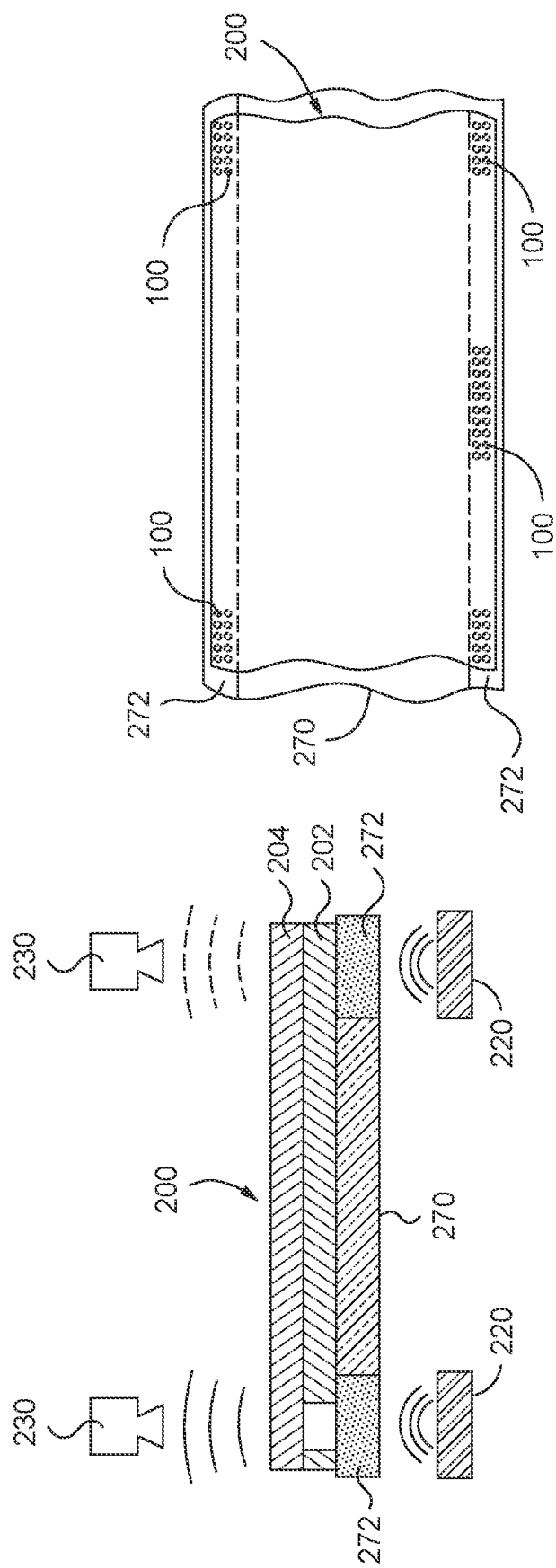

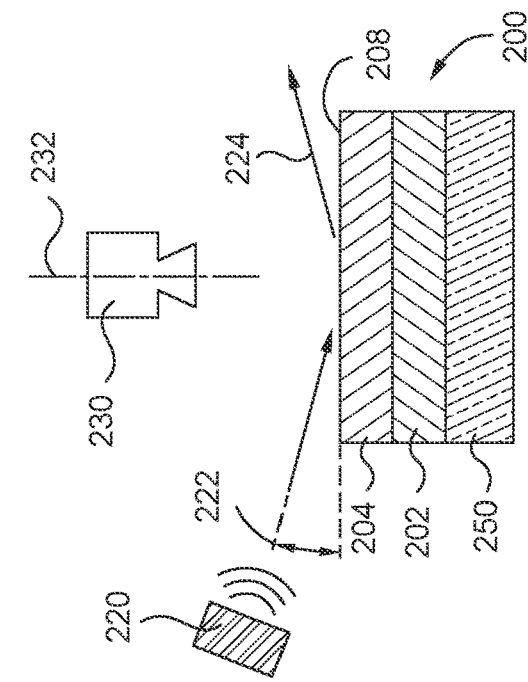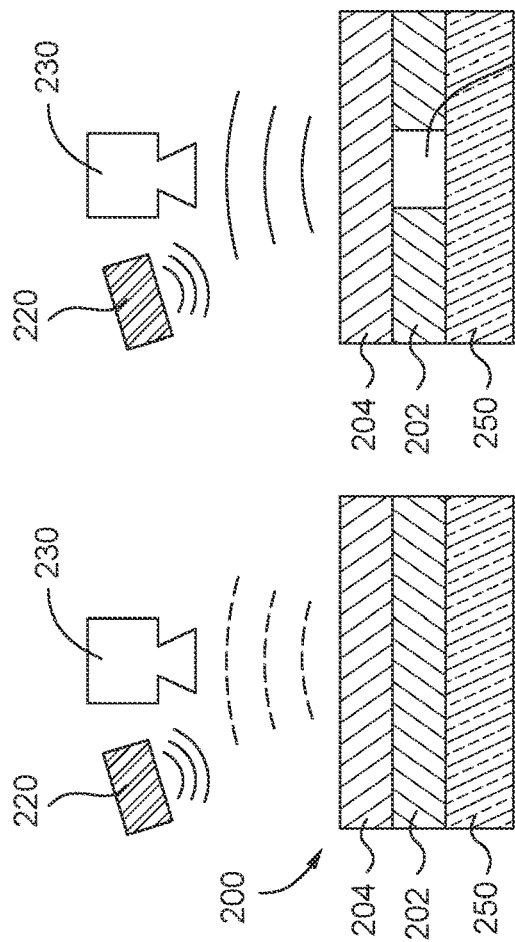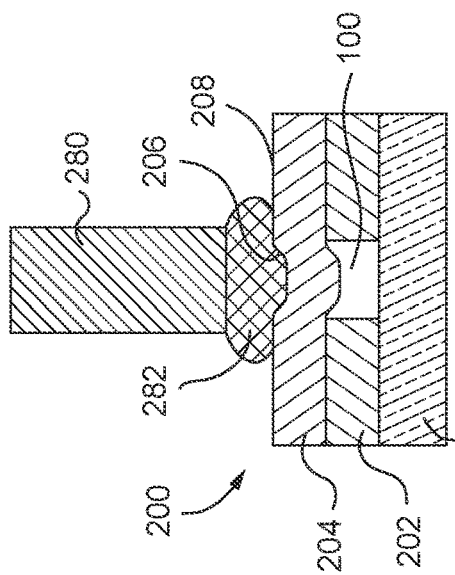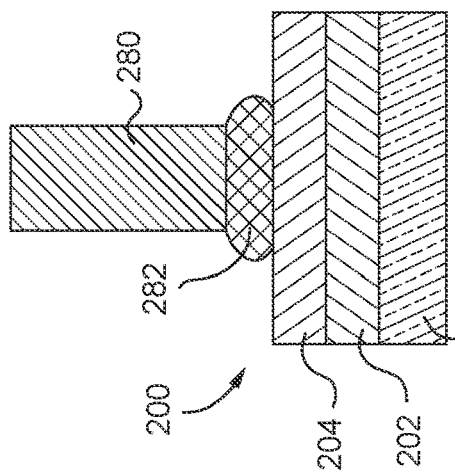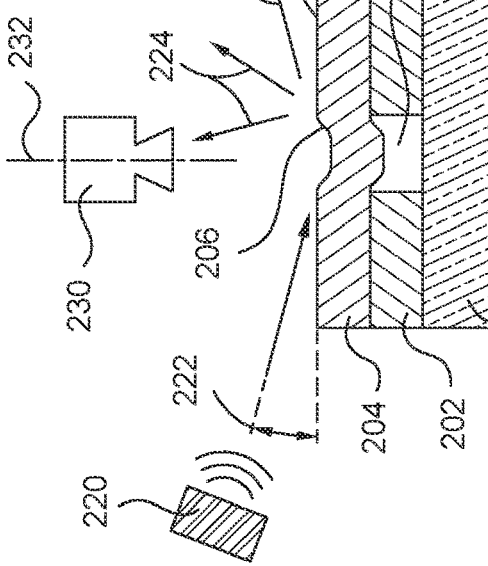

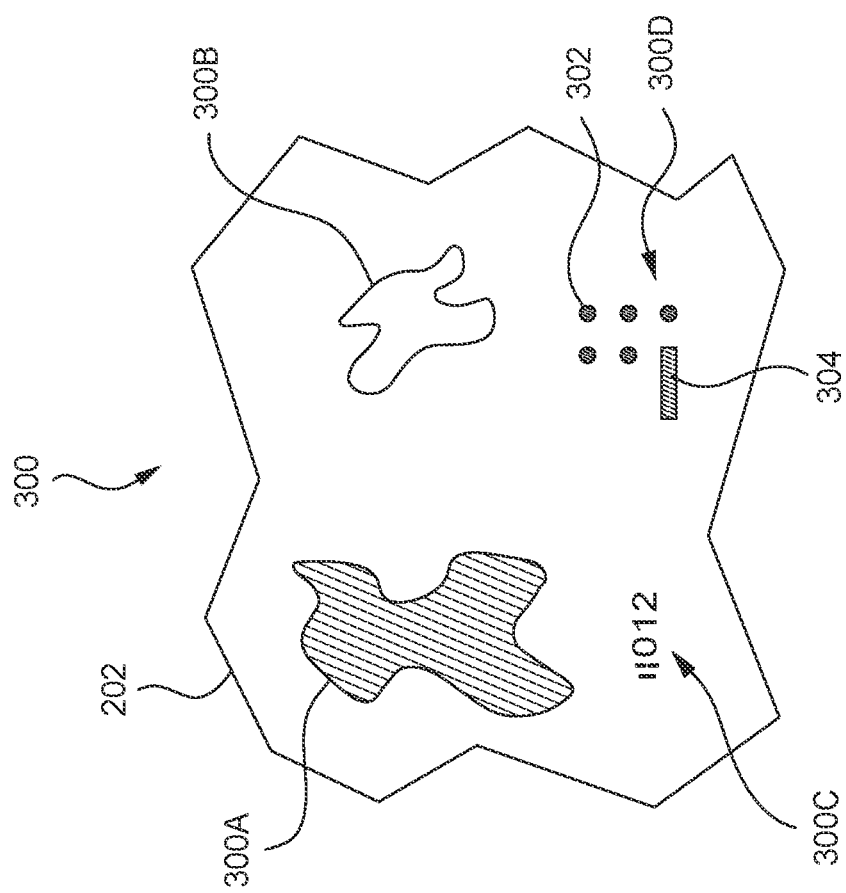
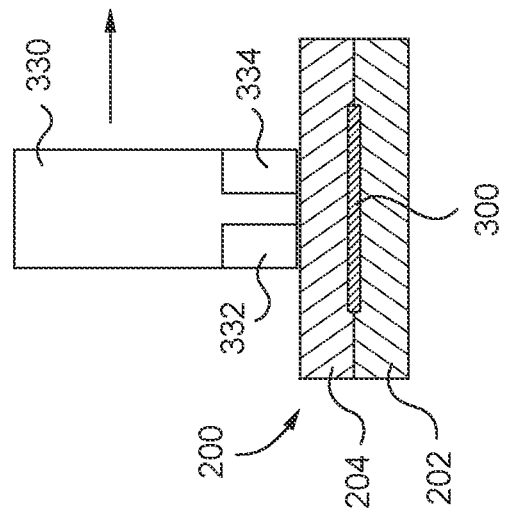
FIG. 10A
FIG. 10B

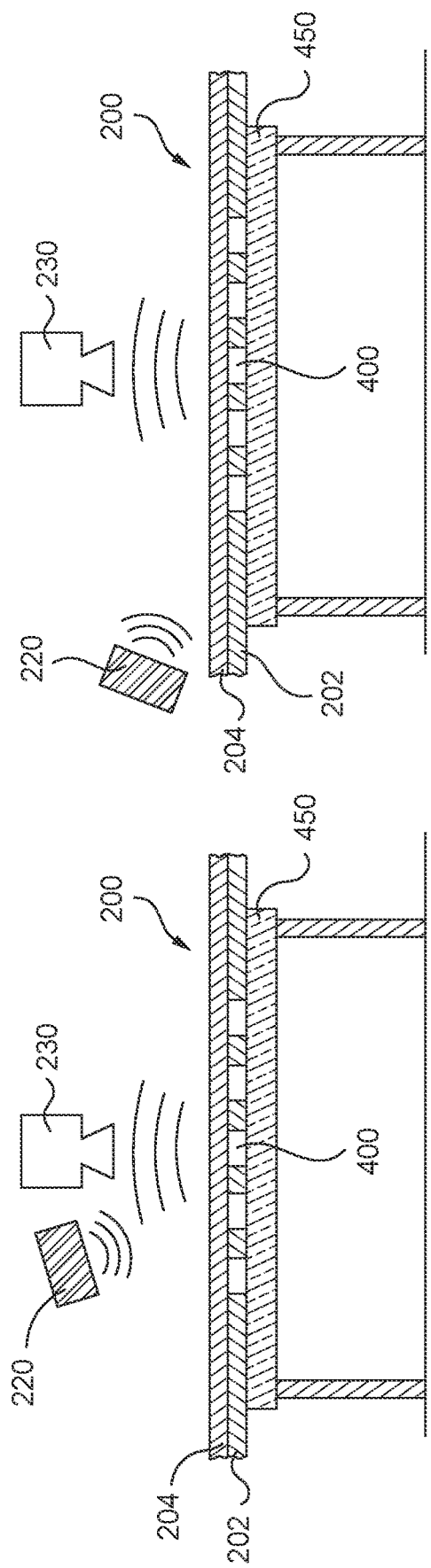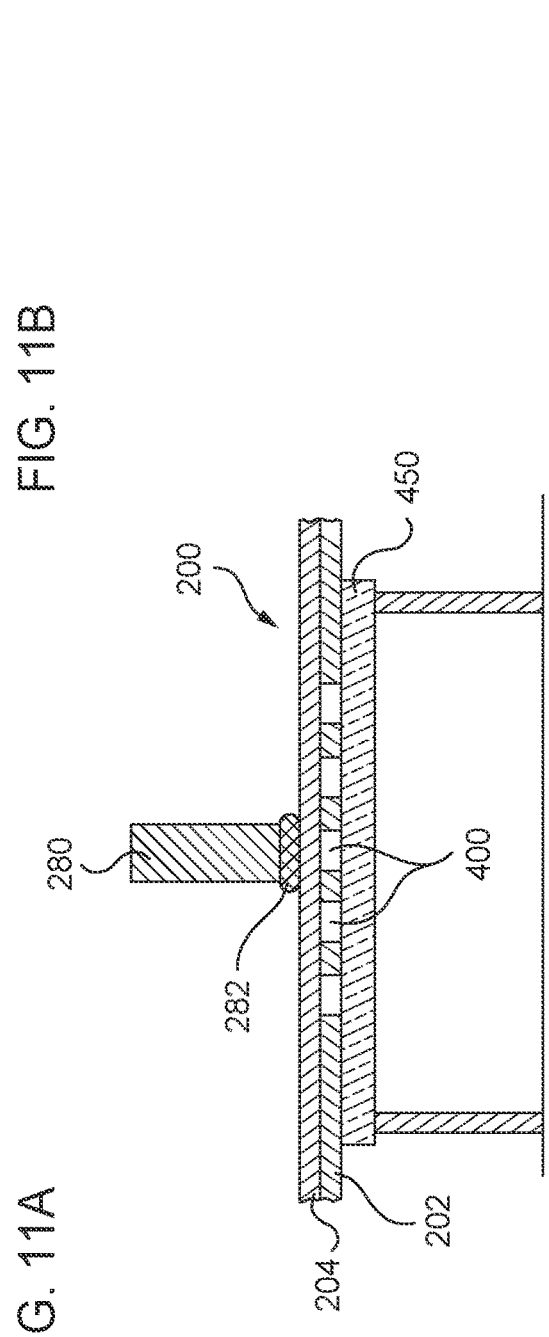

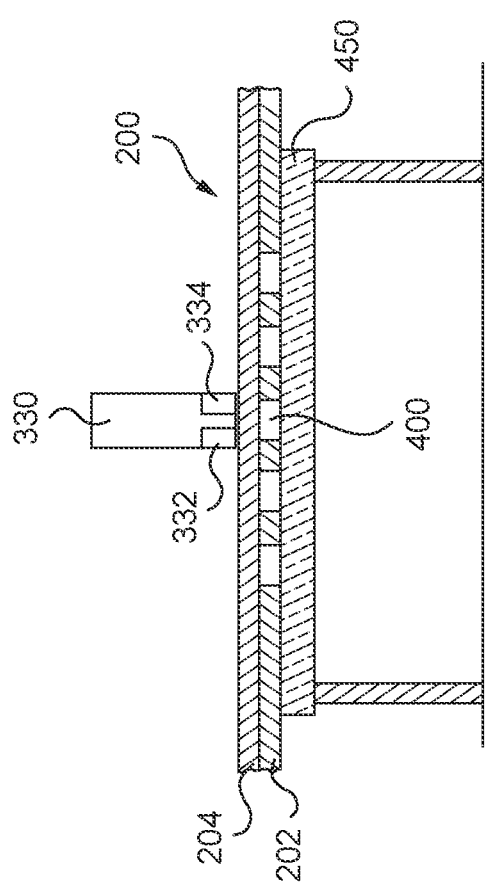
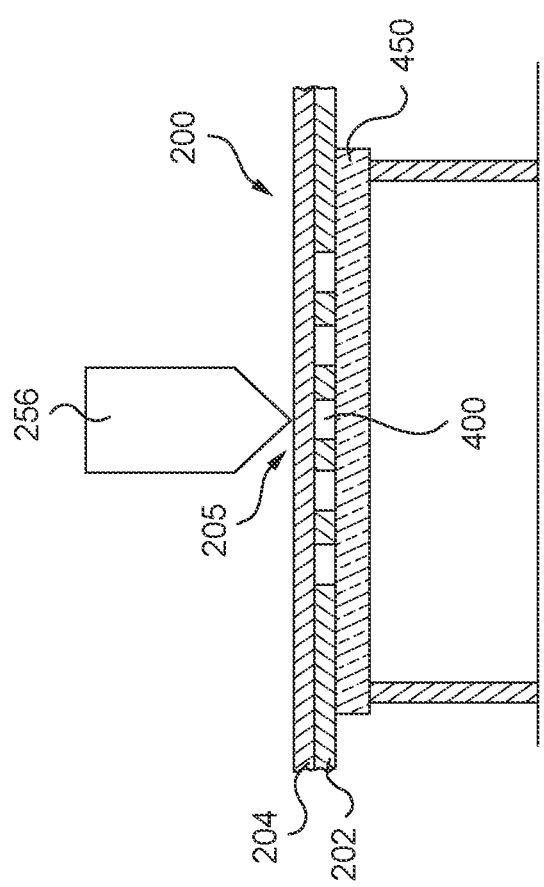

US 11,566,368 B1

VISION SYSTEMS AND METHODS FOR LOCATING FIDUCIALS IN MANUFACTURING FABRIC ARTICLES

TECHNICAL FIELD

Embodiments of the present disclosure provide apparatus, articles of manufacture, and methods for establishing and using reference locations in fabrics for use in the manufacture of articles.

BACKGROUND

The manufacture of articles that include fabrics involves performing operations, such as printing, cutting, and joining, on a web of fabric. The location of such operations on the web can be referenced with respect to fiducials on the web. Typically, the fiducials are printed onto portions of the web. However, some operations result in the portion of the web including the fiducial being cut away from the portion of the web that eventually forms the finished article, which renders the fiducial useless for any subsequent operation.

Additionally, some operations result in the portion of the web including the fiducial being obscured by another piece of fabric (or other material), such as a portion of second web, which creates difficulty in locating the fiducial for any subsequent operation. One solution is to trim the second web to be narrower than the web that includes the fiducials in order to avoid obscuring the fiducials. However, this unnecessarily wastes material, and adds time and cost to the manufacture of the articles.

There is a need for the creation and detection of fiducials that alleviate the above problems.

SUMMARY

Embodiments of the present disclosure provide apparatus, articles of manufacture, and methods for establishing and using reference locations in fabrics for use in the manufacture of articles. In one embodiment, a method of manufacturing a fabric article includes creating a fabric article by placing a second fabric portion on top of a first fabric portion, the first fabric portion including a fiducial at a first location, and detecting the fiducial through the second fabric portion. Detecting the fiducial involves positioning the fabric article between a source of electromagnetic radiation and a sensor, measuring a first intensity of electromagnetic radiation arriving at the sensor when directing electromagnetic radiation from the source towards a first region of the fabric article that contains the fiducial, measuring a second intensity of electromagnetic radiation arriving at the sensor when directing electromagnetic radiation from the source towards a second region of the fabric article that does not contain the fiducial, and identifying a difference between the first intensity and the second intensity.

In another embodiment, a method of manufacturing a fabric article includes creating a fabric article by placing a second fabric portion on top of a first fabric portion, the first fabric portion including a fiducial at a first location, and detecting the fiducial through the second fabric portion. Detecting the fiducial involves positioning the fabric article between a heat source and a sensor, measuring a first intensity of infrared light arriving at the sensor when a first region of the fabric article that contains the fiducial is positioned near the heat source, measuring a second intensity of infrared light arriving at the sensor when a second region of the fabric article that does not contain the fiducial is positioned near the heat source, and identifying a difference between the first intensity and the second intensity.

In another embodiment, a method of manufacturing a fabric article includes creating a fabric article by placing a second fabric portion on top of a first fabric portion, the first fabric portion including a fiducial at a first location, the fiducial including magnetic material, and detecting the fiducial through the second fabric portion by scanning the second fabric portion with a sensor. The sensor includes a MICR reader or a Hall Effect sensor.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

FIGS. 2A-2C schematically illustrate exemplary fiducials in a fabric.

FIGS. 5A-5C schematically illustrate a procedure that may be incorporated into the processes of FIGS. 4D-4G.

FIGS. 6A and 6B schematically illustrate a system that may be used when conducting any of the processes or procedures of FIGS. 4A-4G or FIGS. 5A-5C.

FIGS. 7A and 7B schematically illustrate a system for detecting the fiducials of FIGS. 2A-2C.

FIGS. 8A and 8B schematically illustrate a system for detecting the fiducials of FIGS. 2A-2C.

FIGS. 9A and 9B schematically illustrate a system for detecting the fiducials of FIGS. 2A-2C.

FIGS. 10A and 10B schematically illustrate a system for creating and detecting fiducials.

FIGS. 11A-11E schematically illustrate example processes in the manufacture of a fabric article.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure provide apparatus, articles of manufacture, and methods for establishing and using fiducials in fabrics, such as textiles, such as sheet materials, such as leather, cloth, and the like, for use in the manufacture of articles. Some examples of such articles include, but are not limited to, garments (e.g. shirts, pants, socks, shoes, shorts, coats, jackets, skirts, dresses, underwear, hats, headbands, and the like), accessories (e.g. wallets, purses, and the like), and homewares (e.g. artwork, upholstery, towels, bed linens, blankets, mats, and the like). The fiducials can be detected even if obscured.

Figure 1:
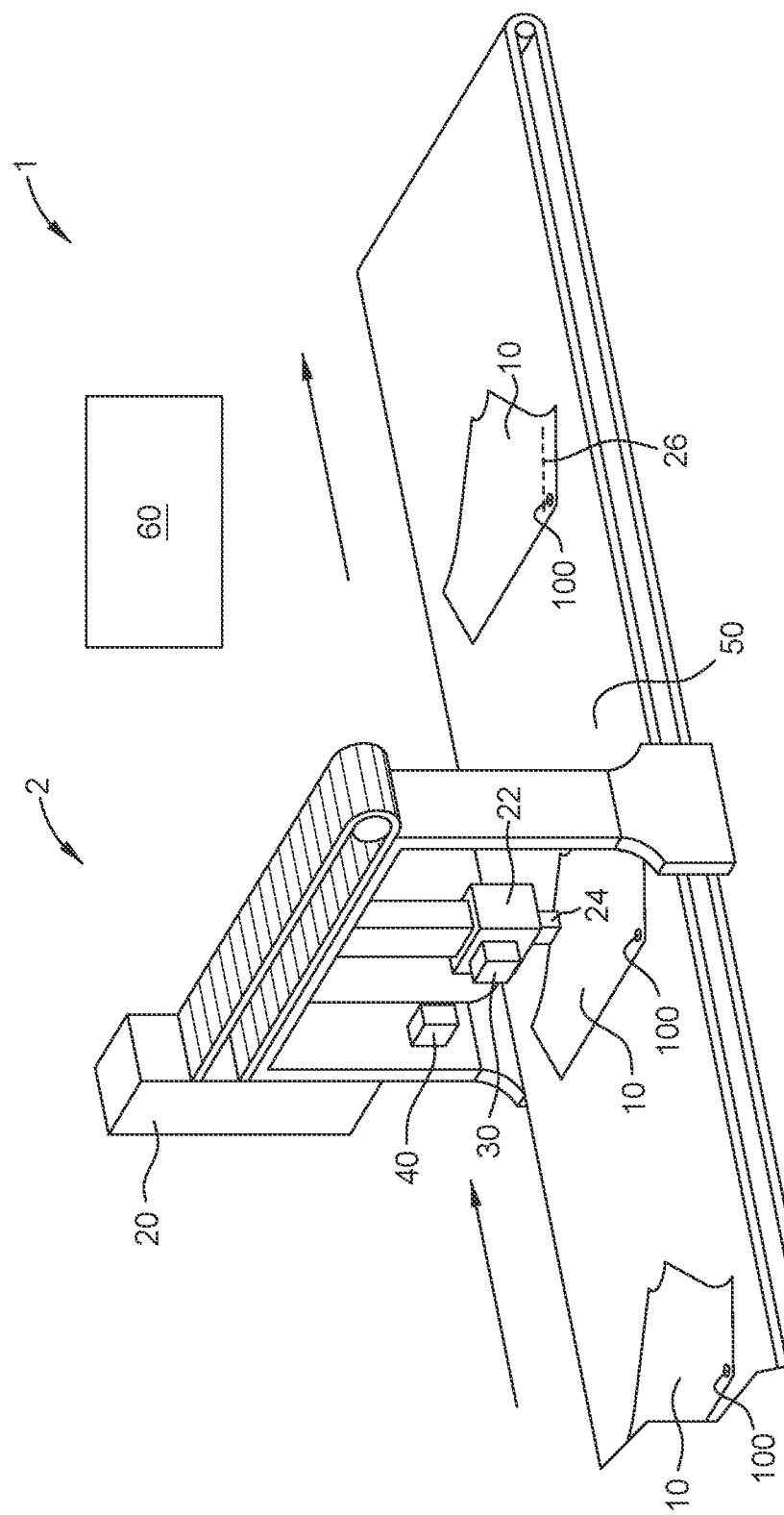
FIG. 1 schematically illustrates a work station of a system for manufacturing fabric articles.

FIG. 1 schematically illustrates a work station of a system 1 for manufacturing fabric articles. The system 1 includes one or more work stations at which an operation is performed, such as applying a pretreatment, printing a design, cutting, stitching, applying adhesive, curing adhesive, or joining. The illustrated example is a work station 2 for applying adhesive to an item of fabric 10. The work station 2 includes an adhesive applicator 20. The adhesive applicator 20 dispenses adhesive 26 through a nozzle 24 that is attached to a movable head 22. The adhesive applicator 20 applies the adhesive 26 onto an item of fabric 10 that is laying on a work surface 50. In the illustrated example, the work surface 50 is part of a conveyor. However, in some embodiments, the work surface 50 may be part of a structure such as a table.

The fabric 10 includes a fiducial 100. The adhesive applicator 20 includes a source of electromagnetic radiation 40, such as a lamp, that illuminates the fabric 10 at the work station 2. The adhesive applicator 20 includes a sensor 30, such as a camera, that detects the fiducial 100. Detection of the fiducial 100 facilitates control of the adhesive applicator 20, such as by a controller 60. The adhesive applicator 20 applies adhesive 26 onto the fabric 10 according to a prescribed regime that is correlated with the fiducial 100. The application of the adhesive 26 onto the fabric 10 may be directed by the controller 60.

The controller 60 may include one or more software applications stored in memory and executed using one or more processors in a computing system. The controller 60 receives data from sensors, such as sensor 30, cameras, proximity sensors, and the like that are associated with the apparatus of a work station, such as the work station 2. The controller 60 processes the data, and directs the operation of one or more pieces of apparatus of the work station, such as the work station 2.

In some embodiments, the fiducial 100 is not obscured from the sensor 30. In some embodiments, the fiducial 100 is obscured from the sensor 30, but nevertheless, the sensor 30 can detect the fiducial 100.

FIGS. 2A-2C schematically illustrate exemplary fiducials 100 in the fabric 10. Examples of fiducials 100 include fiducials 100A, 100B, 1000, 100D, and 100E depicted in the Figures. In some embodiments, the fabric 10 is a web of fabric. In some embodiments, the fabric 10 is a discrete piece of fabric. In the example depicted in FIG. 2A, the fabric 10 includes a fiducial 100A. In some embodiments, the fiducial 100A includes a characteristic edge of the fabric, such as a cut-out, for example a neck line. In some embodiments, the fiducial 100A includes a single hole 105. As illustrated, in some embodiments, the fiducial 100A includes a first array 110 of holes 105. As illustrated, in some embodiments, the holes 105 of the first array 110 are equally spaced. In some embodiments, the holes 105 of the first array 110 may not be equally spaced. In some embodiments, the fiducial 100A includes one or more markings on the fabric 10 that may be visible or detectable to one or more sensors 30. In some embodiments, the fiducial 100A may be formed by indentation, embossing, ink detectable outside of the visible light spectrum, or may be formed by other mechanisms. In some embodiments, one or more fiducial 100A may be used as a reference point or datum for locating features, such as fabric edges. In some embodiments, one or more fiducial 100A may be used as a reference point or datum for identifying a target location on the fabric 10 for performing an operation on the fabric 10. Example operations include applying adhesive, applying a treatment, applying stitching, printing a design, or cutting the fabric 10.

The first array 110 of holes 105 provides a reference for a location of one or more features relevant to an operation in the manufacture of an article. In the illustrated example, one feature is a cut line 12 showing where the fabric is to be cut, and another feature is an adhesive line 14 showing where an adhesive is to be applied to the fabric. Such features are not necessarily drawn on the fabric 10 itself. In the illustrated example, the locations of such features may be determined at least in the X direction with reference to the first array 110 of holes 105.

In some embodiments, the fiducial 100A includes a second array 120 of holes 105. As illustrated, the cut line 12 and the adhesive line 14 are between the first array 110 of holes 105 and the second array 120 of holes 105. In an example, the second array 120 of holes 105 serves as a fiducial for subsequent operations after the first array 110 of holes 105 has been removed when the fabric 10 is cut along the cut line 12.

FIG. 2B schematically illustrates examples of fiducials 100 from which the locations of features relevant to an operation in the manufacture of an article may be determined in the X and the Y directions. In one example, the cut line 12 and the adhesive line 14 are between the first array 110 of holes 105 and the second array 120 of holes 105 in the fabric 14, as described above. The first array 110 of holes 105 and/or the second array 120 of holes 105 provide the location references for the cut line 12 and/or the adhesive line 14 in the X direction. In this example, in fiducial 100B the separation 150 between hole 105A and hole 105B of the first array 110 is different from the separation 160 between hole 105B and hole 105C. Such a difference in separation provides location references for the cut line 12 and/or the adhesive line 14 in the Y direction. As illustrated, the cut line 12 and the adhesive line 14 each deviate at specific locations in the Y direction that are referenced by fiducial 100B.

In another example illustrated in FIG. 2B, fiducial 1000 includes a hole 106 is provided adjacent to hole 105C of the first array 110. Hole 106 includes a different shape than hole 105C. Such a difference in shape provides location references for the cut line 12 and/or the adhesive line 14 in the Y direction. In some embodiments, such a difference in shape may provide location references for the cut line 12 and/or the adhesive line 14 in the X direction.

FIG. 2C schematically illustrates examples of fiducials 100 from which the locations of features relevant to an operation in the manufacture of an article may be determined in the X and the Y directions. In one example, the cut line 12 and the adhesive line 14 are between the first array 110 of holes 105 and the second array 120 of holes 105 in the fabric 10, as described above. The first array 110 of holes 105 and/or the second array 120 of holes 105 provide the location references for the cut line 12 and/or the adhesive line 14 in the X direction. In this example, fiducial 100D includes a hole 107 adjacent to and between hole 105B and hole 105C of the first array 110. Hole 107 includes a different size than hole 105B. Such a difference in size provides location references for the cut line 12 and/or the adhesive line 14 in the Y direction. As illustrated, the cut line 12 and the adhesive line 14 each deviate at specific locations in the Y direction. In some embodiments, such a difference in size may provide location references for the cut line 12 and/or the adhesive line 14 in the X direction.

In another example illustrated in FIG. 2C, in fiducial 100E, nominally each hole 105 of the first array 110 is adjacent, or paired with, a corresponding hole 105 of the second array 120. However, holes 105C and 105D of the first array 110 are not adjacent, or paired with, corresponding holes of the second array 120. Such an arrangement provides location references for the cut line 12 and/or the adhesive line 14 in the Y direction. As illustrated, the cut line 12 and the adhesive line 14 each deviate at specific locations in the Y direction. In some embodiments, such an arrangement may provide location references for the cut line 12 and/or the adhesive line 14 in the X direction.

Figure 3C:
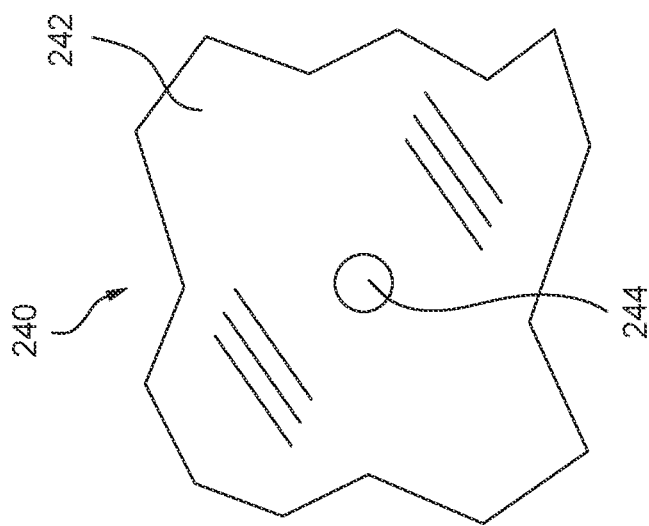
FIGS. 3A-3C schematically illustrate a system for detecting the fiducials of FIGS. 2A-2C.
Figure 3B:
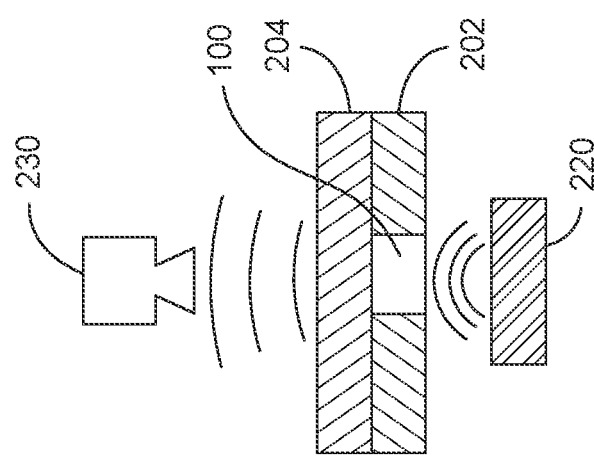
Figure 3A:
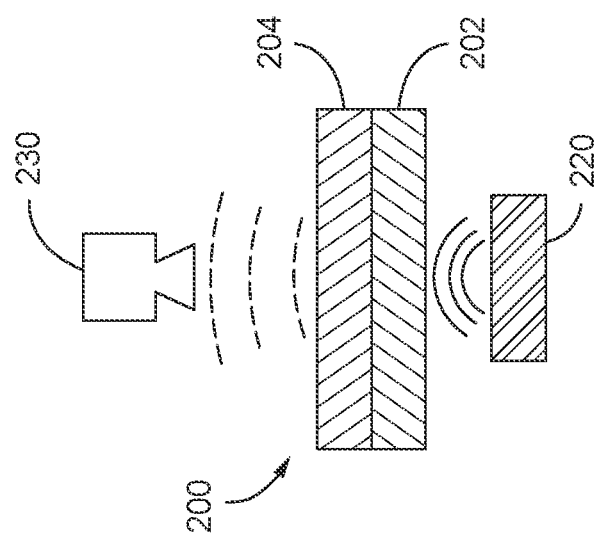

FIGS. 3A-3C schematically illustrate a system for detecting the fiducials 100 of FIGS. 2A-2C. FIG. 3A shows a section of a fabric article 200 that includes a first fabric portion 202 overlaid by a second fabric portion 204. The fabric article 200 is positioned between a source of electromagnetic radiation 220 and a sensor 230. The source 220 irradiates the fabric article 200 by directing electromagnetic radiation at the fabric article 200. The sensor 230 is aligned with the source 220 such that at least some electromagnetic radiation from the source 220 that passes through the fabric article 200 is detected by the sensor 230. The electromagnetic radiation makes a single pass through the fabric article 200. In some embodiments, the electromagnetic radiation includes visible light. In some embodiments, the electromagnetic radiation includes radiation of wavelengths shorter than wavelengths of visible light, such as ultraviolet light. In some embodiments, the electromagnetic radiation includes radiation of wavelengths longer than wavelengths of visible light, such as infrared, terahertz, or microwaves. In some embodiments, the source 220 is a heating plate that emits thermal radiation in the form of infrared radiation. The sensor 230 is configured to detect the electromagnetic radiation emitted by the source 220. In the example in which the electromagnetic radiation includes visible light, the sensor 230 may include a camera or a photomultiplier.

FIG. 3B shows another section of the fabric article 200 positioned between the source 220 and the sensor 230. In FIG. 3B, the first fabric portion 202 includes a fiducial 100 that includes a hole (such as any of hole 105, 106, 107, described above), whereas the first fabric portion 220 in FIG. 3A does not include a fiducial in the form of a hole. When the scenario depicted in FIG. 3B is viewed from above, the second fabric portion 204 obscures the fiducial 100. Nevertheless, the sensor 230 is used to detect the fiducial through the second fabric portion 204. The presence of the fiducial 100 in FIG. 3B results in an intensity of the electromagnetic radiation measured by the sensor 230 in the scenario depicted in FIG. 3A being different from an intensity of the electromagnetic radiation measured by the sensor 230 in the scenario depicted in FIG. 3B.

In some embodiments, the sensor 230 is used to generate an image 240 of the fabric article 200 when the fabric article 200 is irradiated by the source 220. The image may depict features, such as the fiducial 100 illustrated in FIG. 3B. FIG. 3C is a schematic illustration of such an image 240. The image 240 includes a first region 242 in which the intensity of electromagnetic radiation measured by the sensor 230 is relatively low. The image 240 includes a second region 244 in which the intensity of the electromagnetic radiation measured by the sensor 230 is relatively high. The second region 244 corresponds to the fiducial 100 of FIG. 3B. A controller (such as controller 60, FIG. 1) coupled to the sensor 230 can discern the location of the fiducial 100 by identifying the difference between the intensity of the electromagnetic radiation in the first region 242 and the intensity of the electromagnetic radiation in the second region 244.

Figure 4A:
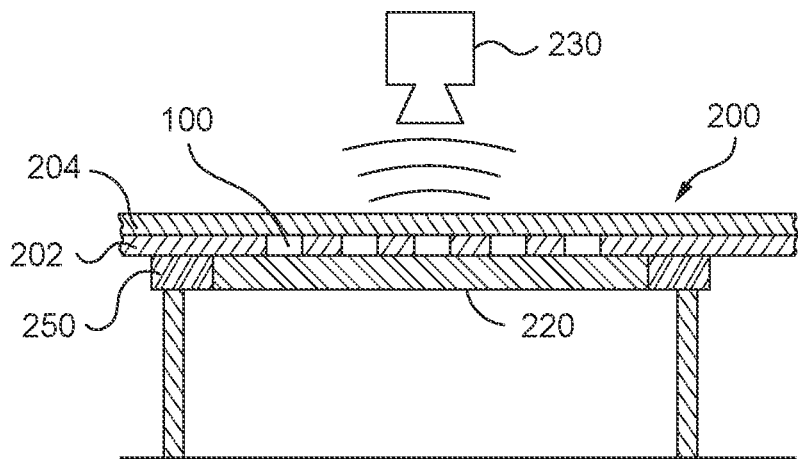
FIGS. 4A-4G schematically illustrate example processes in the manufacture of a fabric article.
Figure 4B:
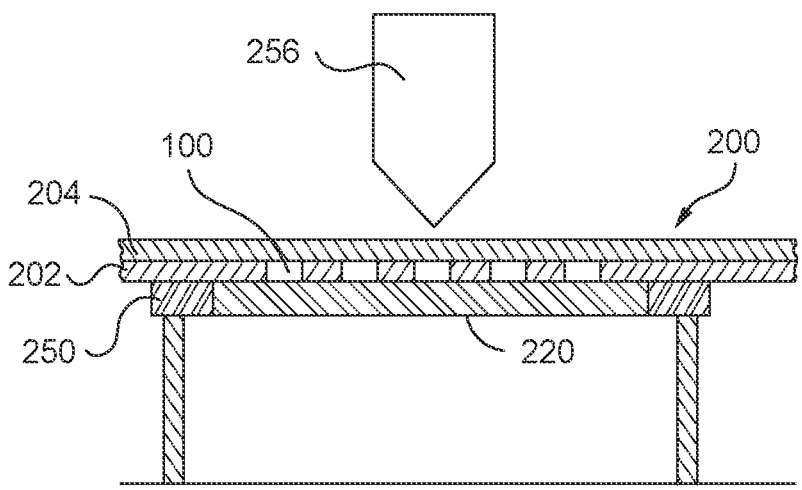

FIGS. 4A and 4B schematically illustrate an example process in the manufacture of a fabric article 200. The fabric article 200 includes a first fabric portion 202 overlaid by a second fabric portion 204. In some embodiments, the first fabric portion 202 is part of a web of fabric. In some embodiments, the second fabric portion 204 is part of a web of fabric. The first fabric portion 202 includes one or more fiducial 100, such as described above. The fabric article 200 is depicted at a processing station, such as a printing station or a cutting station. The fabric article 200 is positioned on a work surface 250. The work surface 250 may be any structure upon which the fabric article 200 is placed in order to undergo a manufacturing operation, such as cutting, applying adhesive, applying a pretreatment, printing, stitching, or joining a third fabric portion to the fabric article 200. The work surface 250 includes a source of electromagnetic radiation 220, such as described above. The fabric article 200 is positioned between the source 220 and a sensor 230. In FIG. 4A, the source 220 directs electromagnetic radiation at the fabric article 200. Electromagnetic radiation that penetrates through the fabric article 200 is detected by the sensor 230. The sensor 230 is used to identify the location of each fiducial 100 through the second fabric portion 204, as described above.

In some embodiments, a controller (such as controller 60, FIG. 1) uses the identified location of each fiducial 100 to direct an operation on the fabric article 200. In an example, the controller uses the identified location of each fiducial 100 to identify a target location 205 on the fabric article 200 at which to conduct the operation. FIG. 4B schematically illustrates a process tool 256 conducting an operation at the target location 205 of the fabric article 200 on the work surface 250. In some embodiments, the operation is conducted at the portion of the work surface 250 that includes the source 220.

In some embodiments, the operation includes applying a pretreatment to the fabric article 200, and the process tool 256 includes a pretreatment applicator. In some embodiments, the operation includes printing a design, and the process tool 256 includes a printhead. In some embodiments, the operation includes cutting, and the process tool 256 includes a cutter. In some embodiments, the operation includes stitching, and the process tool 256 includes a sewing needle. In some embodiments, the operation includes applying adhesive, and the process tool 256 includes an adhesive applicator. In some embodiments, the operation includes joining a third fabric portion to the fabric article 200, and the process tool 256 includes any one or more of a cutter, a sewing needle, an adhesive applicator, or a heating plate.

In some embodiments in which the operation includes applying adhesive, the adhesive is applied in the form of a liquid deposited onto the fabric article 200. In some embodiments, the adhesive permeates at least partially into the fabric article 200. In some embodiments, the adhesive at least partially remains on a surface of the fabric article 200. In some embodiments, the adhesive is cured by any one or more of applying pressure, applying heat, applying moisture, exposing the adhesive to ambient conditions, or waiting for a predetermined duration of time. In some embodiments, the adhesive is deposited onto the fabric article 200 in one or more of a continuous line, a non-continuous line, one or more droplets, a single line, or multiple lines. In some embodiments, lines or droplets may be deposited onto the fabric article 200 according to one or more of uniform shape, uniform size, uniform separation between adjacent droplets, varying shape, varying size, or varying separation between adjacent droplets. In some embodiments, the adhesive is deposited onto the fabric article 200 in a pattern tailored according to any one or more of a desired seam size, a desired seam strength, or a desired accommodation of stretch of the fabric article 200.

Figure 4C:
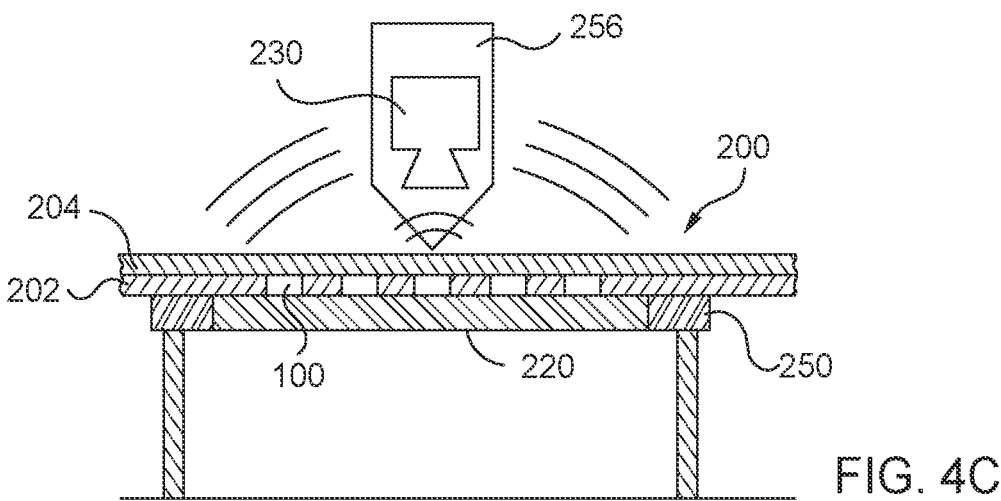

FIG. 4C schematically illustrates the sensor 230 being coupled to, or integrated with, the process tool 256. In conducting the process described above with the arrangement of FIG. 4C, movement of the sensor 230 may be accomplished by the same mechanism that moves the process tool 256. Such an arrangement enables the precise positioning of the process tool 256 with respect to the fabric article 200 when conducting the operation on the fabric article 200.

Figure 4D:
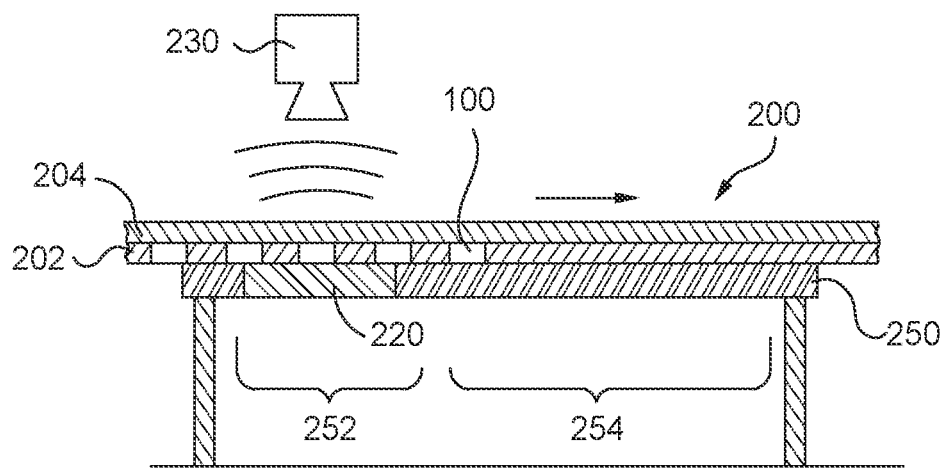
Figure 4E:
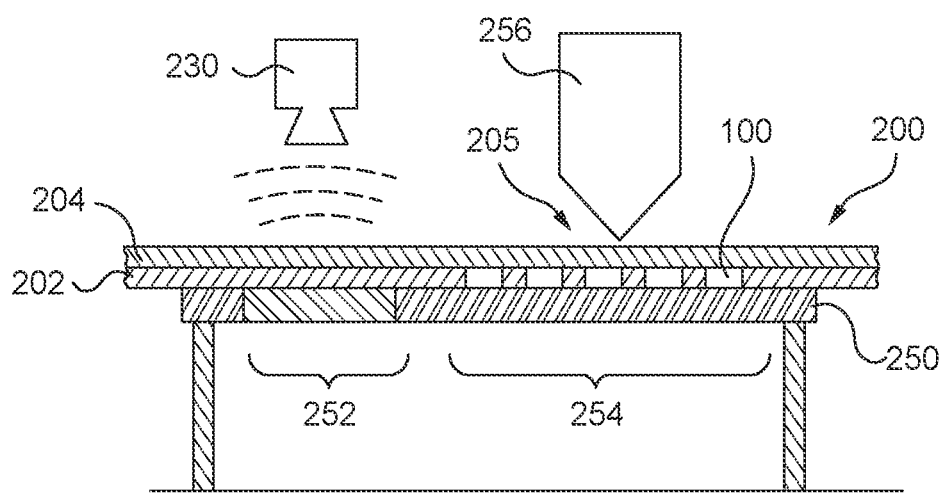

FIGS. 4D and 4E schematically illustrate a variation of the example process depicted in FIGS. 4A-4C. In FIGS. 4D and 4E, the work surface 250 includes a first portion 252 that includes the source of electromagnetic radiation 220, and a second portion 254 at which the operation (such as described above) is conducted on the fabric article 200. The fabric article 200 is positioned on the work surface 250 between the source 220 and the sensor 230, and the source 220 and the sensor 230 are used to identify the location of each fiducial 100 through the second fabric portion 204, as described above.

In some embodiments, a controller (such as controller 60, FIG. 1) uses the identified location of each fiducial 100 to direct an operation on the fabric article 200. In an example, the controller uses the identified location of each fiducial 100 to identify the target location 205 on the fabric article 200 at which to conduct the operation.

The fabric article 200 is moved, such as in the direction of the arrow, to place the target location 205 at the second portion 254 of the work surface 250. In some embodiments, the placement of each fiducial 100 at the first portion 252 of the work surface 250 that includes the source 220 also achieves placement of the target location 205 at the second portion 254 of the work surface 250. In FIG. 4E, the process tool 256 conducts the operation at the target location 205 of the fabric article 200, as described above. In some embodiments, the sensor 230 may be coupled to, or integrated with, the process tool 256, as described above.

Figure 4F:
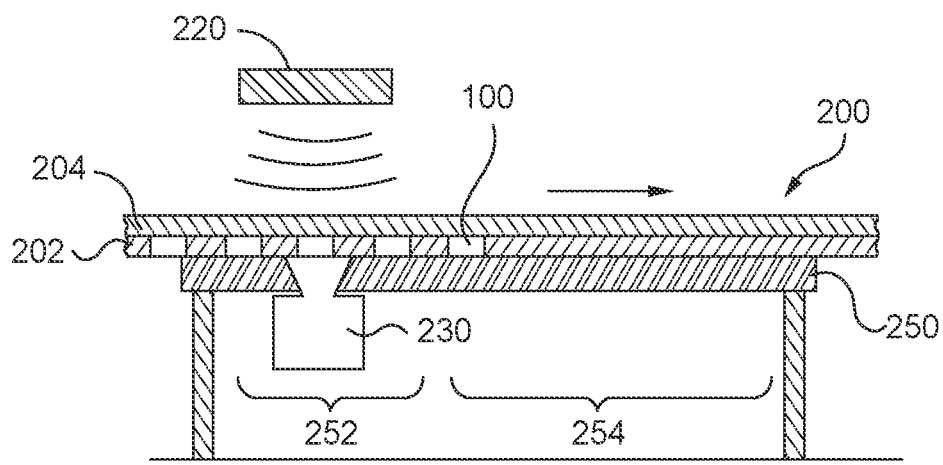
Figure 4G:
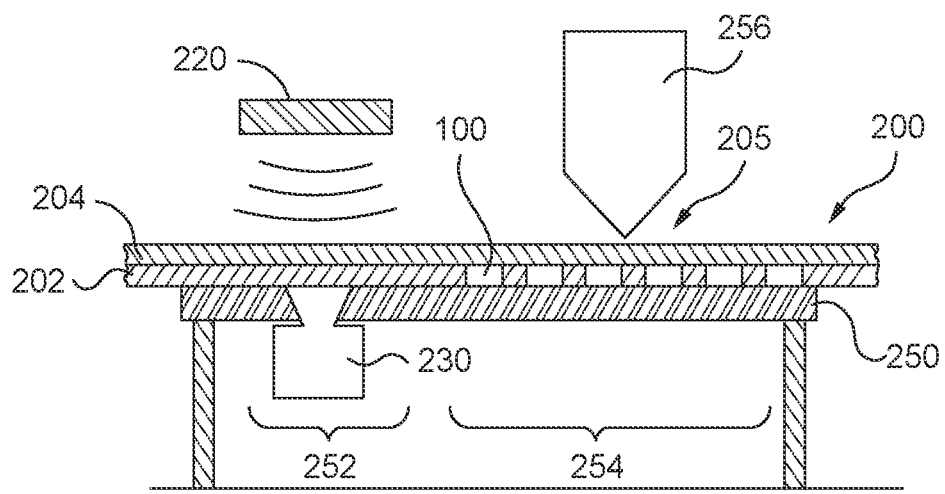

FIGS. 4F and 4G schematically illustrate a variation of the example process depicted in FIGS. 4D and 4E. In FIGS. 4F and 4G, the first portion 252 of the work surface 250 includes the sensor 230, and the source of electromagnetic radiation 220 is positioned above the first portion 252 of the work surface 250. The fabric article 200 is positioned on the work surface 250 between the source 220 and the sensor 230. The source 220 and the sensor 230 are used to identify the location of each fiducial 100 through the second fabric portion 204, as described above, except that the electromagnetic radiation travels through the second fabric portion 204 before the first fabric portion 202.

In some embodiments, a controller (such as controller 60, FIG. 1) uses the identified location of each fiducial 100 to direct an operation on the fabric article 200. In an example, the controller uses the identified location of each fiducial 100 to identify the target location 205 on the fabric article 200 at which to conduct the operation.

The fabric article 200 is moved, such as in the direction of the arrow, to place the target location 205 at the second portion 254 of the work surface 250. In some embodiments, the placement of each fiducial 100 at the first portion 252 of the work surface 250 that includes the sensor 230 also achieves placement of the target location 205 at the second portion 254 of the work surface 250. In FIG. 4G, the process tool 256 conducts the operation at the target location 205 of the fabric article 200, as described above. In some embodiments, the source 220 may be coupled to, or integrated with, the process tool 256.

FIGS. 5A-5C schematically illustrate a procedure that may be incorporated into the processes of FIGS. 4D-4G to move the fabric article 200 in order to place the target location 205 at the second portion 254 of the work surface 250 while maintaining a fix of the target location 205 on the fabric article 200. FIG. 5A depicts the fabric article 200 positioned on the first portion 252 of the work surface 250 such that a first region 212 of the fabric article 200 is between the source of electromagnetic radiation 220 and the sensor (not shown). As described above, the sensor is used to detect a fiducial 100 in the first region 212. The fabric article 200 is gripped by one or more first clamps 262. In some embodiments, each of the one or more first clamps 262 includes fingers 266. In some embodiments, each of the one or more first clamps 262 includes a perforated surface, through which a vacuum is applied in order to grip the fabric article 200.

The one or more first clamps 262 are used to move the fabric article 200 in the direction of the arrow, and position the fabric article 200 on the second portion 254 of the work surface 250. FIG. 5B depicts the one or more first clamps 262 moving the fabric article 200 during the positioning. In some embodiments, the one or more first clamps 252 are used to move the fabric article 200 such that a second region 214 of the fabric article 200 is positioned between the source of electromagnetic radiation 220 and the sensor. In some embodiments, the sensor is used to detect a fiducial 100 in the second region 214, as described above. FIG. 5B also depicts a target location 205 on the fabric article 200 at which an operation (such as described above) is to be conducted. In some embodiments, the position of the target location 205 is determined as a result of detecting the fiducial 100 in the first region 212 of the fabric article 200. In some embodiments, the position of the target location 205 is determined as a result of detecting the fiducial 100 in the second region 214 of the fabric article 200. In some embodiments, the position of the target location 205 is determined as a result of detecting the fiducial 100 in the first region 212 and the fiducial 100 in the second region 214 of the fabric article 200.

In some embodiments, the fabric article 200 is gripped by one or more second clamps 264. In some embodiments, each of the one or more second clamps 264 includes fingers 266. In some embodiments, each of the one or more second clamps 264 includes a perforated surface, through which a vacuum is applied in order to grip the fabric article 200. In some embodiments, each second clamp 264 is positioned at a predetermined separation distance from a corresponding first clamp 262.

In embodiments in which the fabric article 200 is gripped by one or more second clamps 264, the fabric article 200 is moved by the one or more first clamps 262 and the one or more second clamps 264 to position the fabric article 200 on the second portion 254 of the work surface 250. In some of such embodiments, the predetermined separation distance between each first clamp 262 and each corresponding second clamp 264 is maintained while positioning the fabric article 200 on the second portion 254 of the work surface 250. In other embodiments, the predetermined separation distance between each first clamp 262 and each corresponding second clamp 264 is not maintained while positioning the fabric article 200 on the second portion 254 of the work surface 250. In some embodiments, the one or more second clamps 264 may be omitted.

FIG. 5C depicts the fabric article 200 with the target location 205 positioned at the second portion 254 of the work surface 250 at which the operation (as described above) is to be conducted.

FIGS. 6A and 6B schematically illustrate the use of a conveyor 270 to move the fabric article 200 when conducting any of the processes or procedures described above. FIG. 6A is a part cross-sectional view, and FIG. 6B is a top view, of the fabric article 200 on a conveyor 270. The conveyor 270 includes one or more sections 272 that are translucent or transparent to the electromagnetic radiation emitted by the source. The fabric article 200 is positioned on the conveyor 370 such that the fiducials 100 are located above the one or more translucent or transparent sections 272. In some embodiments in which the conveyor 270 is used to move the fabric article 200, the work surface 250 on which the operation (as described above) is to be conducted includes the conveyor 270.

FIGS. 7A and 7B schematically illustrate a system for detecting the fiducials 100 of FIGS. 2A-2C. FIG. 7A shows the section of the fabric article 200 of FIG. 3A, including the first fabric portion 202 overlaid by the second fabric portion 204. The fabric article 200 is positioned on a work surface 250. The work surface 250 may be any structure upon which the fabric article 200 is placed in order to undergo a manufacturing operation, such as cutting, applying adhesive, applying a pretreatment, printing, stitching, or joining a third fabric portion to the fabric article 200. Additionally, or alternatively, the work surface 250 may include a conveyor, such as conveyor 270.

The fabric article 200 is positioned between the work surface 250 and one or more sources of electromagnetic radiation 220. Additionally, the fabric article 200 is positioned between the work surface 250 and a sensor 230. The sensor 230 and the one or more sources 220 are arranged such that electromagnetic radiation emitted by the one or more sources 220 passes through the first fabric portion 202 and the second fabric portion 204, and then reflects off the work surface 250 and passes back through the first fabric portion 202 and the second fabric portion 204 towards the sensor 230. In some embodiments, the electromagnetic radiation includes visible light. In some embodiments, the electromagnetic radiation includes radiation of wavelengths shorter than wavelengths of visible light, such as ultraviolet light. In some embodiments, the electromagnetic radiation includes radiation of wavelengths longer than wavelengths of visible light, such as infrared, terahertz, or microwaves. In some embodiments, the electromagnetic radiation includes low-coherence light, and the sensor 230 includes an optical coherence tomography photodetector. In some embodiments, the electromagnetic radiation is configured for a terahertz imaging technique, and the sensor 230 includes a terahertz imaging sensor, such as a terahertz imaging camera.

FIG. 7B shows the section of the fabric article 200 of FIG. 3B positioned on the work surface 250, and between the work surface 250 and the source(s) 220 and sensor 230. As in FIGS. 3A and 3B, the first fabric portion 202 in FIG. 7B includes a fiducial 100 that includes a hole, whereas the first fabric portion 202 in FIG. 7A does not include a fiducial in the form of a hole. When the scenario depicted in FIG. 7B is viewed from above, the second fabric portion 204 obscures the fiducial 100. Nevertheless, the sensor 230 is used to detect the fiducial 100 through the second fabric portion 204. The presence of the fiducial 100 in FIG. 7B results in an intensity of the electromagnetic radiation measured by the sensor 230 in the scenario depicted in FIG. 7A being different from an intensity of the electromagnetic radiation measured by the sensor 230 in the scenario depicted in FIG. 7B. In the scenario depicted in FIG. 7B, a portion of the electromagnetic radiation emitted by the source(s) 220 passes through the fiducial 100.

In some embodiments, the sensor 230 is used to generate an image of the fabric article 200 when the fabric article 200 is irradiated by the source(s) 220. The image may depict features, such as the fiducial 100 illustrated in FIG. 7B, and may appear similar to the image 240 schematically depicted in FIG. 3C.

FIGS. 8A and 8B schematically illustrate a system for detecting the fiducials 100 of FIGS. 2A-2C. FIG. 8A shows the section of the fabric article 200 of FIG. 7A, including the fabric article 200 positioned on the work surface 250, as described above. FIG. 8B shows the section of the fabric article 200 of FIG. 7B, including the fabric article 200 positioned on the work surface 250, as described above. As in FIGS. 7A and 7B, the first fabric portion 202 in FIG. 8B includes a fiducial 100 that includes a hole, whereas the first fabric portion 100 in FIG. 8A does not include a fiducial in the form of a hole.

As shown in FIG. 8B, the presence of the fiducial 100 in the first fabric portion 202 causes an undulation 206 of an upper surface 208 of the second fabric portion 204. In some embodiments, part of the second fabric portion 204 naturally sinks into the fiducial 100. In some embodiments, a vacuum is applied in order to promote the sinking of part of the second fabric portion 204 into the fiducial 100. In an example, the work surface 250 may include holes through which the vacuum is applied. As illustrated, in some embodiments, the undulation 206 includes a depression in the upper surface 208 of the second fabric portion 204. Additionally, or alternatively, in some embodiments, the undulation 206 of the upper surface 208 of the second fabric portion 204 at the fiducial 100 may include a raised bump of the upper surface 208 of the second fabric portion 204. In an example, the fiducial 100 may include an item placed between the first fabric portion 202 and the second fabric portion 204 to create the raised bump of the upper surface 208 of the second fabric portion 204. For instance, the item may include another piece of fabric, a piece of paper or plastic, or a globule of adhesive.

The system of FIGS. 8A and 8B is configured to perform dark field illumination of the fabric article 200. A sensor 230 is positioned to receive electromagnetic radiation reflected off the upper surface 208 of the second fabric portion 204. In some embodiments, a central axis 232 of the optics of the sensor 230 is substantially perpendicular to the upper surface 208 of the second fabric portion 204, such as at 80 degrees to 90 degrees. A source of electromagnetic radiation 220 is positioned to direct the electromagnetic radiation onto the upper surface 208 of the second fabric portion 204 at an acute angle 222 to the upper surface 208 of the second fabric portion 204, such as at 30 degrees or less, 20 degrees or less, or 10 degrees or less.

In some embodiments, the electromagnetic radiation includes visible light. In some embodiments, the electromagnetic radiation includes radiation of wavelengths shorter than wavelengths of visible light, such as ultraviolet light. In some embodiments, the electromagnetic radiation includes radiation of wavelengths longer than wavelengths of visible light, such as infrared, terahertz, or microwaves.

The electromagnetic radiation emitted by the source 220 is reflected off the upper surface 208 of the second fabric portion 204. As shown in FIG. 8A, the sensor 230 and the source 220 are positioned such that a majority of the reflected electromagnetic radiation 224 is not received by the sensor 230. However, as shown in FIG. 8B, the undulation 206 in the upper surface 208 of the second fabric portion 204 results in scattering of the electromagnetic radiation such that the sensor 230 receives a greater amount of the reflected electromagnetic radiation 224. The presence of the fiducial 100 in FIG. 8B results in an intensity of the electromagnetic radiation measured by the sensor 230 in the scenario depicted in FIG. 8A being different from an intensity of the electromagnetic radiation measured by the sensor 230 in the scenario depicted in FIG. 8B.

In some embodiments, the sensor 230 is used to generate an image of the fabric article 200 when the fabric article 200 is irradiated by the source 220. The image may depict features, such as the fiducial 100 illustrated in FIG. 8B, and may appear similar to the image 240 schematically depicted in FIG. 3C.

FIGS. 9A and 9B schematically illustrate a system for detecting the fiducials of FIGS. 2A-2C. FIG. 9A shows the section of the fabric article 200 of FIG. 8A, including the fabric article 200 positioned on the work surface 250, as described above. FIG. 9B shows the section of the fabric article 200 of FIG. 8B, including the fabric article 200 positioned on the work surface 250, as described above. As in FIGS. 8A and 8B, the first fabric portion 202 in FIG. 9B includes a fiducial 100 that includes a hole, whereas the first fabric portion 202 in FIG. 9A does not include a fiducial in the form of a hole.

As shown in FIG. 9B, the presence of the fiducial 100 in the first fabric portion 202 causes an undulation 206 of an upper surface 208 of the second fabric portion 204. In some embodiments, part of the second fabric portion 204 naturally sinks into the fiducial 100. In some embodiments, a vacuum is applied in order to promote the sinking of part of the second fabric portion 204 into the fiducial 100. In an example, the work surface 250 may include holes through which the vacuum is applied. As illustrated, in some embodiments, the undulation 206 includes a depression in the upper surface 208 of the second fabric portion 204. As described above, additionally, or alternatively, in some embodiments, the undulation 206 of the upper surface 208 of the second fabric portion 204 at the fiducial 100 includes a raised bump of the upper surface 208 of the second fabric portion 204.

The system of FIGS. 9A and 9B is configured to detect the fiducial 100 by physical contact between a sensor 280 and the upper surface 208 of the second fabric portion 204. The sensor 280 includes a pad 282 of a deformable material. In some embodiments, the deformable material is a gel, and the pad 282 includes a membrane enclosing the gel. In use, a force is applied through the pad 282 onto the upper surface 208 of the second fabric portion 204, and deformation of the pad 282 is measured by the sensor 280. In some embodiments, when the pad 282 encounters the undulation 206, the pad 282 deforms, and the deformation of the pad 282 is registered by the sensor 280. In some embodiments, when the pad 282 is placed against a section of the second fabric portion 204 above the fiducial 100, the force applied through the pad 282 presses at least part of the second fabric portion 204 into the fiducial 100 and forms the undulation 206. In so doing, the pad 282 deforms, and the deformation of the pad 282 is registered by the sensor 280.

FIGS. 10A and 10B schematically illustrate a system for creating and detecting fiducials. FIG. 10A depicts a top view of a section of the first fabric portion 202 on which fiducials 300 include magnetic material, such as particles or filaments containing iron. In some embodiments, the magnetic material is inserted into the first fabric portion 202, such as by weaving. In some embodiments, the magnetic material is on a sticker applied to the first fabric portion 202. In an example, the magnetic material includes magnetic ink printed onto the sticker. In some embodiments, the magnetic material includes magnetic ink printed onto the first fabric portion 202. Fiducial 300A covers an area of the first fabric portion 202. In an example, fiducial 300A covers an area equivalent to the target location on the eventual fabric article at which an operation (such as any operation described above) is to be conducted. Fiducial 300B is a line, such as a cut line or an adhesive line, such as described above. As illustrated, in some embodiments, the line of Fiducial 300B may delineate an area equivalent to the target location on the eventual fabric article at which an operation (such as any operation described above) is to be conducted.

Fiducial 3000 includes one or more characters printed in a font that is readable by a Magnetic Ink Character Recognition (MICR) reader. In an example, the font may be similar to a font used in printing MICR characters on checks issued by a financial institution, such as a bank. Fiducial 300D includes one or more dots 302 and/or other shapes 304 arranged in a pattern. In an example, the dots 302 and/or other shapes 304 may be arranged in a pattern similar to a bar code, a QR code, or the like.

In some embodiments, the configuration of any of fiducial 300A, fiducial 300B, fiducial 3000, or fiducial 300D may be configured to include a code. In an example, a controller (such as controller 60, FIG. 1) may use the code to perform a task, such as determine an identity of the fabric article or determine a target location at which an operation (such as any operation described above) is to be conducted. In some embodiments, the fiducial 300 may include any one or more of the elements of fiducial 300A, fiducial 300B, fiducial 3000, or fiducial 300D.

FIG. 10B depicts the detection of the fiducial 300. FIG. 10B shows a section of a fabric article 200 that includes the first fabric portion 202 overlaid by a second fabric portion 204. The first fabric portion 202 includes a fiducial 300, such as any of fiducials 300A, 300B, 3000, or 300D. When the scenario depicted in FIG. 10B is viewed from above, the second fabric portion 204 obscures the fiducial 300. Nevertheless, a sensor 330 is used to detect the fiducial 300 through the second fabric portion 204. In some embodiments, the sensor 330 includes a Hall Effect sensor. In some embodiments, the sensor 330 includes a reader 332 that detects the presence of the fiducial 300. In some embodiments, the reader 332 also detects a shape of the fiducial 300. In an example, the reader 332 includes a MICR reader that detects the printed characters of fiducial 3000 and/or the printed dots 302 or other shapes 304 of fiducial 300D. The sensor 330 is moved relative to the fabric article 200, and scans the fabric article 200 to establish the locations and coding (if any) of the fiducials 300.

As illustrated, in some embodiments, the sensor includes a magnetizer 334 that magnetizes the magnetic material of the fiducial 300 prior to the reader 332 detecting the fiducial 300. In some embodiments, the magnetizer 334 may be omitted. In some embodiments, the magnetic material is magnetized prior to overlying the first fabric portion 202 with the second fabric portion 204. In some embodiments, the magnetic material is magnetized prior to approaching the fabric article 200 with the sensor 330.

FIGS. 11A-11E schematically illustrate example processes in the manufacture of a fabric article 200, similar to the example processes of FIGS. 4A-4C. As in FIGS. 4A-4C, in each of FIGS. 11A-11E, the fabric article 200 includes a first fabric portion 202 overlaid by a second fabric portion 204. In some embodiments, the first fabric portion 202 is part of a web of fabric. In some embodiments, the second fabric portion 204 is part of a web of fabric. The first fabric portion 202 includes one or more fiducial 400. In some embodiments, the fiducial 400 includes a fiducial 100, as described above with respect to FIGS. 2A-2C. In some embodiments, the fiducial 400 includes a fiducial 300, as described above with respect to FIGS. 10A and 10B.

In each of FIGS. 11A-11E, the fabric article 200 is depicted at a processing station, such as a printing station or a cutting station. The fabric article 200 is positioned on a work surface 450. The work surface 450 may be any structure upon which the fabric article 200 is placed in order to undergo a manufacturing operation, such as cutting, applying adhesive, applying a pretreatment, printing, stitching, or joining a third fabric portion to the fabric article 200. In some embodiments, the work surface 450 includes a source of electromagnetic radiation, such as described above for the work surface 250. As illustrated, in some embodiments, the work surface 450 does not include a source of electromagnetic radiation. In some embodiments in which a conveyor (such as conveyor 270) is used to move the fabric article 200, the work surface 450 includes the conveyor.

In FIG. 11A, the fiducial 400 includes a fiducial 100, and the Figure depicts the fiducial 400 being detected and/or identified using any of the systems and techniques described above with respect to FIGS. 7A and 7B. In FIG. 11B, the fiducial 400 includes a fiducial 100, and the Figure depicts the fiducial 400 being detected and/or identified using any of the systems and techniques described above with respect to FIGS. 8A and 8B. In FIG. 11C, the fiducial 400 includes a fiducial 100, and the Figure depicts the fiducial 400 being detected and/or identified using any of the systems and techniques described above with respect to FIGS. 9A and 9B. In FIG. 11D, the fiducial 400 includes a fiducial 300, and the Figure depicts the fiducial 400 being detected and/or identified using any of the systems and techniques described above with respect to FIG. 10B.

In some embodiments, a controller (such as controller 60, FIG. 1) uses the identified location of each fiducial 400 to direct an operation on the fabric article 200. In an example, the controller uses the identified location of each fiducial 400 to identify the target location on the fabric article 200 at which to conduct the operation. FIG. 11E schematically illustrates a process tool 256 conducting an operation at the target location 205 of the fabric article 200 on the work surface 450 after the detection of the fiducial 400 depicted in any of FIGS. 11A-11D.

In some embodiments, the operation includes applying a pretreatment to the fabric article 200, and the process tool 256 includes a pretreatment applicator. In some embodiments, the operation includes printing a design, and the process tool 256 includes a printhead. In some embodiments, the operation includes cutting, and the process tool 256 includes a cutter. In some embodiments, the operation includes stitching, and the process tool 256 includes a sewing needle. In some embodiments, the operation includes applying adhesive, and the process tool 256 includes an adhesive applicator. In some embodiments, the operation includes joining a third fabric portion to the fabric article 200, and the process tool 256 includes any one or more of a cutter, a sewing needle, an adhesive applicator, or a heating plate.

In some embodiments, any of the sources 220 or the sensors 230, 280, 330 may be coupled to, or integrated with, the process tool 256. In conducting the process described above, movement of the sensor(s) 230, 280, 330 may be accomplished by the same mechanism that moves the process tool 256. Such an arrangement enables the precise positioning of the process tool 256 with respect to the fabric article 200 when conducting the operation on the fabric article 200.

It is contemplated that any of the systems, apparatus, or methods of the present disclosure may be combined with any other of the systems, apparatus, or methods of the present disclosure in a manufacturing process. For example, a fabric article 200 may include one or more fiducial 100 and one or more fiducial 300. A process station, such as an adhesive application station, may be configured to operate pursuant to identifying fiducial 100 but not fiducial 300, whereas another process station, such as a printing station, may be configured to operate pursuant to identifying fiducial 300 but not fiducial 100. In another example, a process station may be configured to locate and identify a fiducial, such as fiducial 100, using a combination of fiducial identification techniques, such as the techniques described above with respect to FIGS. 3A and 3B combined with the techniques described above with respect to FIGS. 7A and 7B.

The systems, apparatus, and methods of the present disclosure may be employed in the manufacture of fabric articles without creating unnecessary waste of material, and without a detrimental impact of the fiducials being obscured by elements of the fabric articles themselves.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

It is contemplated that elements and features of any one disclosed embodiment may be beneficially incorporated in one or more other embodiments. While the foregoing is directed to embodiments of the present disclosure, other and further embodiments of the disclosure may be devised without departing from the basic scope thereof, and the scope thereof is determined by the claims that follow.

What is claimed is:

1. A method of manufacturing a fabric article comprising:
creating a fabric article by placing a second fabric portion on top of a first fabric portion, the first fabric portion including a fiducial at a first location; and
detecting the fiducial through the second fabric portion by:
positioning the fabric article between a source of electromagnetic radiation and a sensor;
measuring a first intensity of electromagnetic radiation arriving at the sensor when directing electromagnetic radiation from the source towards a first region of the fabric article that contains the fiducial;
measuring a second intensity of electromagnetic radiation arriving at the sensor when directing electromagnetic radiation from the source towards a second region of the fabric article that does not contain the fiducial; and
identifying a difference between the first intensity and the second intensity.

2. The method of claim 1, further comprising:
identifying a position of a second location on the fabric article as a result of detecting the fiducial; and
performing an operation on the fabric article at the second location.

3. The method of claim 2, wherein the operation includes one of applying a pretreatment, printing a design, cutting, stitching, applying adhesive, or joining a third fabric portion to the fabric article.

4. The method of claim 1, wherein the fiducial is one of a hole in the first fabric portion or a characteristic edge of the first fabric portion.

5. The method of claim 1, wherein:
the electromagnetic radiation includes visible light; and
the sensor includes one of a camera or a photomultiplier.

6. The method of claim 5, wherein:
the fabric article is located on a conveyor; and
the electromagnetic radiation is directed from the source through a portion of the conveyor.

7. The method of claim 5, wherein the fabric article is located on a first portion of a work surface while the fiducial is detected.

8. The method of claim 7, further comprising:
identifying a position of a second location on the fabric article as a result of detecting the fiducial; and
performing an operation on the fabric article at the second location.

9. The method of claim 8, wherein the operation includes one of applying a pretreatment, printing a design, cutting, stitching, applying adhesive, or joining a third fabric portion to the fabric article.

10. The method of claim 8, further comprising:
after identifying the position of the second location on the fabric article, moving the fabric article to position the second location at a second portion of the work surface at which the operation is conducted.

11. The method of claim 7, wherein the first portion of the work surface includes the source.

12. The method of claim 7, wherein the first portion of the work surface includes the sensor.

13. A method of manufacturing a fabric article comprising:
    creating a fabric article by placing a second fabric portion on top of a first fabric portion, the first fabric portion including a fiducial at a first location; and
    detecting the fiducial through the second fabric portion by:
        positioning the fabric article between a heat source and a sensor;
        measuring a first intensity of infrared light arriving at the sensor when a first region of the fabric article that contains the fiducial is positioned near the heat source;
        measuring a second intensity of infrared light arriving at the sensor when a second region of the fabric article that does not contain the fiducial is positioned near the heat source; and
        identifying a difference between the first intensity and the second intensity.

14. The method of claim 13, further comprising:
    identifying a position of a second location on the fabric article as a result of detecting the fiducial; and
    performing an operation on the fabric article at the second location.

15. The method of claim 14, wherein the operation includes one of applying a pretreatment, printing a design, cutting, stitching, applying adhesive, or joining a third fabric portion to the fabric article.

16. The method of claim 13, wherein the fiducial is one of a hole in the first fabric portion or a characteristic edge of the first fabric portion.

* * * * *